May 31, 1960 R. S. SPENCE 2,938,966

ELECTRO-MECHANICAL TRANSDUCERS

Filed Dec. 16, 1957 2 Sheets-Sheet 1

May 31, 1960 R. S. SPENCE 2,938,966

ELECTRO-MECHANICAL TRANSDUCERS

Filed Dec. 16, 1957 2 Sheets-Sheet 2

United States Patent Office 2,938,966

Patented May 31, 1960

2,938,966

ELECTRO-MECHANICAL TRANSDUCERS

Robert Sydney Spence, Stanstead Abbots, near Ware, England, assignor to Cosmocord Limited, Waltham Cross, England, a British company Filed Dec. 16, 1957, Ser. No. 702,900

2 Claims. (Cl. 179—100.41)

This invention relates to electro-mechanical transducers. The invention can be applied with particular advantage to gramophone pickups. The invention is concerned with the provision of an improved form of transducer.

In accordance with one embodiment of the invention the casing of a piezoelectric transducer is made in one piece and of a flexible material, so that it can be folded to form a substantially closed container for the transducer element.

In accordance with a further feature of the invention, where the invention uses a piezoelectric transducer element, the element is mounted in a pocket or sheath of a resilient, and preferably frictional material; the sheath is mounted within the casing but has projections which extend through openings in the casing. One such projection is used as an attachment point for a stylus carrier, and the other is used as a driving means, coupling the stylus carrier to the transducer element.

Figure 1:
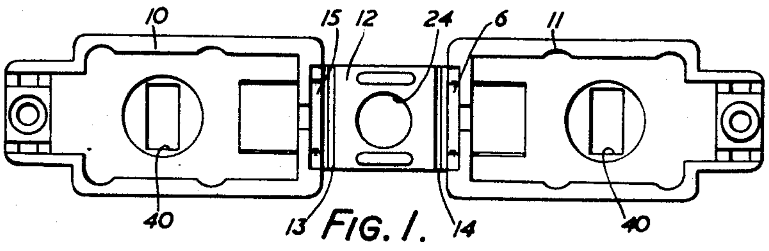
Figure 2:
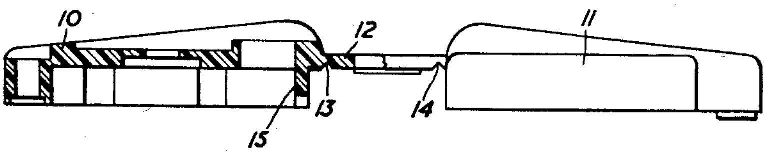
Figure 3:
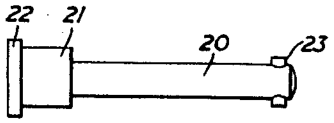
Figure 4:
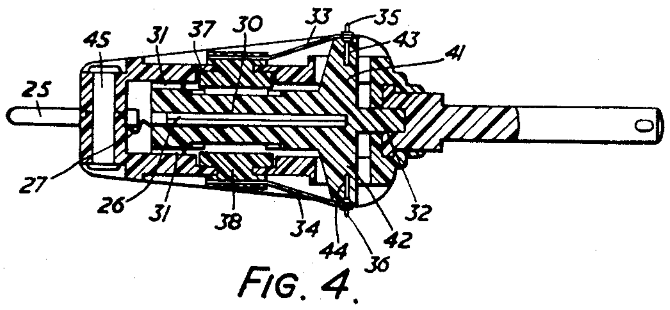
Figure 5:
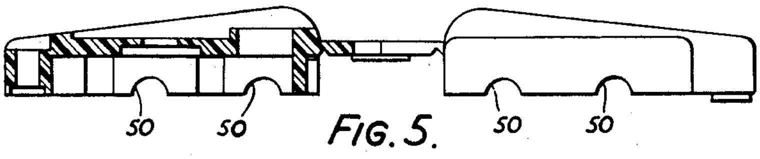
Figure 6:
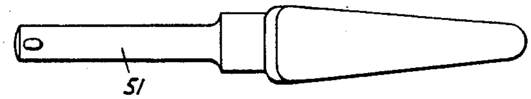
Figure 7:
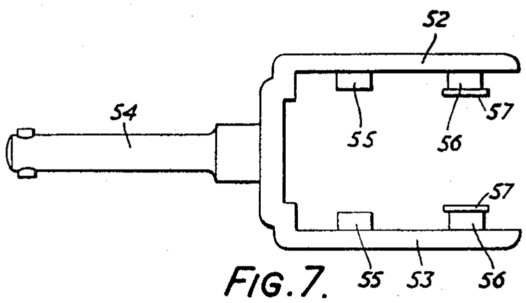
Figure 8:
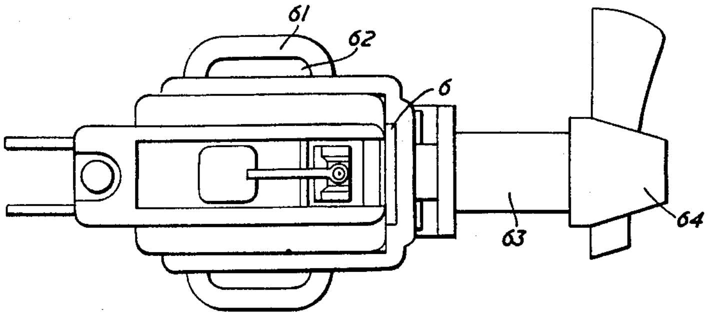

Other features and advantages of the invention will appear from the following description of one embodiment thereof, given by way of example, in conjunction with the accompanying drawings, in which Figure 1 is a plan view of a case moulding for a gramophone pickup, Figure 2 is a side view partly in section of the moulding of Figure 1, Figure 3 is a side view of a mounting spindle for use with the casing of Figures 1 and 2, Figure 4 is a section through a complete pickup cartridge using the parts of Figures 1, 2 and 3, Figure 5 is a side view, partly in section of a casing for use in a second embodiment of the invention, Figure 6 is a side view of a mounting member for this second embodiment, Figure 7 is a plan view of the member of Figure 6, and, Figure 8 is a plan view of the cartridge of the second embodiment.

The embodiment of the invention shown in Figures 1 to 4 is a gramophone pickup cartridge of the dual stylus type, using a piezoelectric transducer element. The cartridge has a casing, from which styli extend at opposite parts; the casing is mounted in a suitable pivotal mounting by which it can be rotated through approximately 180° to bring one or other of the styli into a playing position beneath the cartridge.

The casing of the cartridge is formed in one piece, as a moulding of a flexible thermoplastic material such as nylon, polystyrene or an acetate, as shown in Figures 1 and 2. The moulding consists of two tray-like casing side portions 10 and 11, roughly rectangular, and a short intermediate part 12. The junctions between trays 10 and 11 and the intermediate part 12 are reduced in thickness at 13, 14, so that a hinge is formed. Thereby, it is possible for the two trays to be hinged about parts 13, 14 so as to bring the open sides of the trays together and thus to form a casing, as shown in Figure 4. In this position the intermediate part of the moulding is in a plane at right angles to the plane of the trays, and at what, in use, is the front of the cartridge.

The casing thus formed is adapted to be mounted by a spindle, upon which the casing can also be pivoted in use. A suitable spindle is shown in Figure 3 and comprises a stem 20 of circular cross-section, at one end of which is an enlarged portion 21, also circular in cross-section and an end flanged part 22 which is of square cross-section. At the end of the stem 20 is a small cross pin 23, which is used in mounting a small finger knob on the stem.

The intermediate portion 12 of the case moulding has a circular opening 24 into which the enlarged portion 21 of the spindle can fit; when the case is folded together the squared part 22 is trapped in a small space between the intermediate part 12 and two webs 15, 16 on the casing and is securely held against rotation.

The cartridge makes use of a piezoelectric transducer element 26 of generally rectangular, plate-like form; flexible contact lens 27 extend from the electrodes of the element to contact pins 28. The element is of the twister bimorph type, and is mounted in a moulded sheath or pocket 30 of a resilient frictionally lossy material, such as plasticised polyvinyl chloride. The sheath serves to impose a restraint on the rear part of the piezoelectric element, to damp the mechanical system presented by the element by itself and to provide a means for mechanically coupling the individual stylus carriers to the element.

The damping of the transducing element is effected by arranging that the pocket engages the element over all, or most of a substantial part of the principal faces of the element, in accordance with the degree of damping required. The sheath may engage also the side and front edges of the element.

To provide the restraint on the rear part or on parts of the element remote from the twisting axis, the sheath is formed with projections 31 which are adapted to engage the inner walls of the casing. The compliance and disposition of the projections can be varied considerably, in accordance with the nature of the restraint required to produce a given output characteristic, but in this particular embodiment a projection is provided at each rear corner of the element. The tips of these projections engage the walls of the casing, the major surfaces of the sheath do not engage the inner walls of the casing. The projections also lightly engage the side walls of the casing, so as to locate the element in the casing.

At its forward end the sheath is formed with a small cylindrical projection 32 adapted to enter a corresponding opening in the intermediate part of the casing or the end of spindle 20, so as to provide a pivotal mounting for the centre of the front edge of the element.

The sheath also provides the mechanical coupling between the stylus carriers 33, 34 carrying styli 35, 36 respectively. The two carriers 33, 34 are mounted on the casing by means of two plugs or grommets 37, 38; the grommets fit in openings 40 in the casing walls, shown in Figure 1. These grommets are of frictionally lossy material similar to that used for sheath 30.

The carriers are similar, and each consists of a narrow strip of thin metal such as aluminum alloy, beryllium-copper, or of nylon and the like. The stylus carrier is inserted through a transverse slot in the corresponding grommet and is held partly by friction and partly by means of two enlargements of the carrier, not shown, which prevent its easy withdrawal. In some cases it may be convenient to form integral projections on the sheath; these projections extend through openings similar to openings 40, and the projecting parts used to anchor the rear ends of the carriers.

To provide a mechanical coupling between each stylus carrier and the element, the sheath has two further projections 41, 42 formed on it. These projections also extend from the major faces of the sheath and pass through the casing so as to lie immediately beneath the forward, stylus-carrying ends of the carriers, near to the point where the stylus is mounted. These driving projections are tapered or stepped and means are provided to ensure an adequate coupling between each stylus and the element. As shown, the styli of the carriers 33, 34 have projecting parts 43, 44 respectively which enter small holes in the projecting parts 41, 42 of the sheath. Alternatively, the carriers are shaped to embrace the tips of the projections, by being made of U- or channel section at these parts.

The casing is held closed by rivets 45 passing through the edges of the trays; the terminals 25 can be held in position between the abutting faces of the trays. Alternatively the faces of the casing can be stuck together by applying a suitable adhesive or solvent.

A second form of the invention is shown in Figures 5, 6 and 7 and 8. This form closely resembles that described above, but differs in the way in which the mounting spindle is secured to the casing. The casing is shown in Figure 5; it is the same as that shown in Figures 1 and 2 but for a series of small recesses 50 which are formed on the edges of the trays, two recesses on each edge. When the case is folded the pairs of recesses come into register to form four holes two on each side of the casing. These holes are used to secure the mounting member 51.

The mounting member 51 is shown in Figures 6 and 7, and consists of a bifurcated member having arms 52, 53 and a forwardly extending spindle 54. On the inner edges of the arms 52, 53 are spigots 55 and 56, of which spigots 56 have small peripheral flanges 57. When the case is folded together, the spigots are trapped in the holes formed by recesses 50. The flanges 57 help to retain the arms securely on the casing. The member 51 also has a square depression 58 which receives a corresponding part 60 of the casing, as shown in Figure 8.

Figure 8 also shows a suitable mounting bracket 61 for the cartridge. This includes a mounting part 61, with screw holes 62, and a part at right angles which carries a boss 63. Spindle 54 fits in the boss, and can be turned by means of a small knob 64.

What is claimed:

1. A phonograph pickup cartridge comprising a molded sheath of resilient frictionally-lossy material, said sheath having a pocket therein extending longitudinally from one end thereof, a piezoelectric transducer element mounted in said sheath pocket, a unitary flexible casing having an intermediate portion adjacent the other end of said sheath and normal to the longitudinal axis thereof and a pair of spaced side portions hingedly connected to said intermediate portion and extending longitudinally of said sheath on opposite sides thereof, said intermediate portion of said casing having an opening therein, a mounting spindle having a stem and an enlarged end portion having a non-circular transverse cross-section, said spindle end portion being clamped between said casing end portions adjacent said casing intermediate portion with the stem of said spindle extending longitudinally through the opening in said casing intermediate portion, said casing side portions having oppositely aligned openings therein and said sheath having oppositely arranged lateral projections extending through said openings, each of said casing side portions having a stylus carrier secured at one end thereto, each of said stylus carriers having at the other end thereof a stylus mounted for movement in an opening in the extremity of the adjacent sheath lateral projection, the free ends of said casing side portions extending beyond the adjacent end of said sheath and being connected together to substantially enclose said sheath.

2. Apparatus as defined in claim 1 wherein the free ends of the casing side portions are connected together by rivet means.

References Cited in the file of this patent

UNITED STATES PATENTS

| | | |
|---|---|---|
| 2,228,601 | Hawk | Jan. 14, 1941 |
| 2,687,157 | Cowan | Aug. 24, 1954 |

FOREIGN PATENTS

| | | |
|---|---|---|
| 165,515 | Australia | Oct. 7, 1955 |
| 708,091 | Great Britain | Apr. 28, 1954 |